US012411813B1

(12) United States Patent
Lu et al.

(10) Patent No.: US 12,411,813 B1
(45) Date of Patent: Sep. 9, 2025

(54) LOOPBACK CONTROL IN MULTI-ACTIVE DATABASE SYNCHRONIZATION

(71) Applicant: Zoom Video Communications, Inc., San Jose, CA (US)

(72) Inventors: Liang Lu, Hangzhou (CN); Yuhao Ren, Hangzhou (CN); Qing Wang, Hangzhou (CN); Zhaojun Yu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 76 days.

(21) Appl. No.: 18/459,670

(22) Filed: Sep. 1, 2023

(51) Int. Cl.
*G06F 16/21* (2019.01)
*G06F 11/00* (2006.01)
*G06F 16/27* (2019.01)

(52) U.S. Cl.
CPC ............ *G06F 16/21* (2019.01); *G06F 11/004* (2013.01); *G06F 16/27* (2019.01); *G06F 2201/80* (2013.01)

(58) Field of Classification Search
None
See application file for complete search history.

(56) References Cited

U.S. PATENT DOCUMENTS

| 8,903,779 B1* | 12/2014 | Holenstein | G06F 16/2358 707/685 |
| 2007/0185852 A1* | 8/2007 | Erofeev | G06F 16/166 |
| 2013/0117229 A1* | 5/2013 | Jain | G06F 16/27 707/703 |
| 2024/0330180 A1* | 10/2024 | Acharya | G06F 12/0802 |

* cited by examiner

*Primary Examiner* — Yu Zhao
(74) *Attorney, Agent, or Firm* — Kilpatrick Townsend & Stockton LLP

(57) ABSTRACT

Systems and methods of loopback control in multi-active database synchronization are provided. A first database instance and a second database instance are configured with two-way synchronization. A synchronization tool detects a first log change in a first operation log associated with the first database instance. The first log change includes a first operation entry associated with a first data operation on a first data record in the first database instance. The first data record includes a first synchronization tag field comprising a first source tag representing a first data source associated with the first data operation on the first data record. If the source tag contains the identification of the second database instance, the synchronization tool skips the first operation entry, without synchronizing the first data operation to the second database instance to avoid data loopback.

20 Claims, 7 Drawing Sheets

400

405 — "op" : "i",
"ns" : "zmcalendar.zm_cal_event_changelog",
"ui" : UUID("efgh1234-1234-1234-1234-123456abcedf"),
"o" : {  415                                            420
   "_id" : ObjectId("objectidabcdefg56789"),
   "changeEventType" : NumberInt(1),
   "zmAccountId" : "Abcdefg-HIGKLMN-OPQrst",
   "boundClientIds" : [
     "abcdefgh-5555-4444-3333-222211110000",
     "ijklmnop-9999-8888-7777-666655554444"
410    ],
   "timestamp" : NumberLong(1672313918923),
   "eventUuid" : "hgfedcba-9876-1234-5678-901234abcxyz",
   "resourceId" : " hgfedcba-9876-1234-5678-901234abcxyz",
   "detailChangeType" : NumberInt(4),
   "createdAt" : ISODate("2022-12-29T11:38:38.923+0000"),
   "_class" : "ec"
},  425                         430
"ts" : Timestamp(1672313918, 2),
"t" : NumberLong(8),
"v" : NumberLong(2),
"wall" : ISODate("2022-12-29T11:38:38.925+0000")

```
{
  "op" : "u",
  "ns" : "devdb.device_reflection",
  "ui" : UUID("01234567-8901-2345-abcd-123456789abc"),
  "o" : {
    "$v" : NumberInt(2),
    "diff" : {
      "u" : {
        "modifyTime" : ISODate("2022-12-30T00:23:14.695+0000")
      }
    }
  },
  "o2" : {
    "_id" : "abcdefgh-abcd-abcd-abcd-987654321cba"
  },
  "ts" : Timestamp(1672359794, 1),
  "t" : NumberLong(8),
  "v" : NumberLong(2),
  "wall" : ISODate("2022-12-30T00:23:14.695+0000")
}
```

*FIG. 5*

LOOPBACK CONTROL IN MULTI-ACTIVE DATABASE SYNCHRONIZATION

FIELD

The present application generally relates to database synchronization and more specifically relates to loopback control in multi-active database synchronization.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 shows an example operation entry in an operation log for an insert operation to a data record;

FIG. 5 shows an example operation entry in an operation log for an insert operation to a data record;

DETAILED DESCRIPTION

Figure 1:
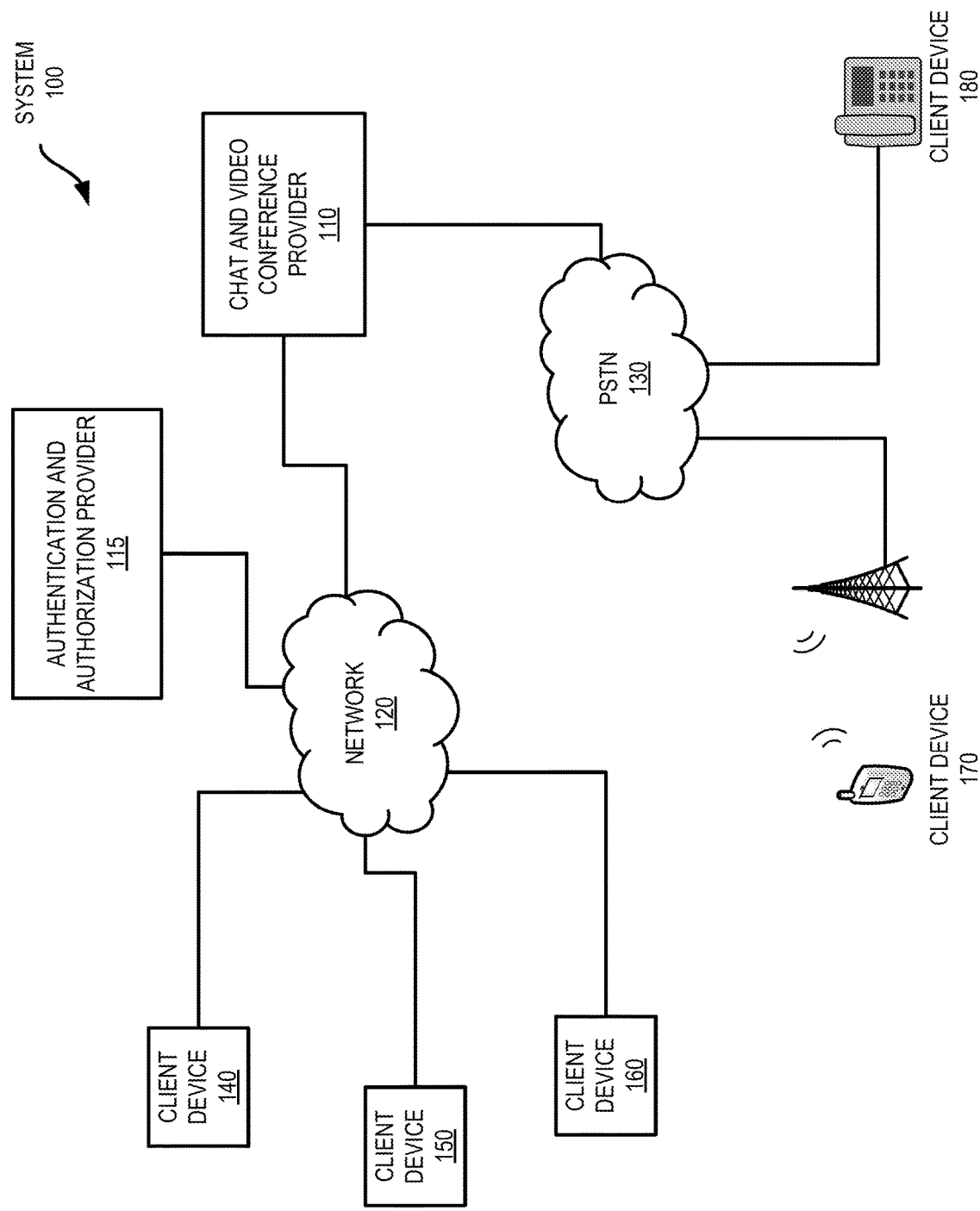
FIG. 1 shows an example system that provides chat and videoconferencing functionality to various client devices.

Examples are described herein in the context of multi-active loopback control in database synchronization. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Application service providers often replicate database instances in different regions (e.g., database instance A in region A, database instance B in region B, etc.) to ensure high availability. A data synchronization service is deployed to synchronize data from one database instance to another database instance. An application service provider can write incremental data in database instance A in region A. Database instance A then generates a record entry in operation log A associated with database instance A, recording the write operation of the incremental data. A synchronization service can fetch the incremental data by detecting a change in operation log A and synchronize the incremental data to database instance B in region B. Database instance B then generates a record entry in operation log B associated with database instance B, recording the synchronization of the incremental data. The synchronization service can detect the change in operation log B and may synchronize the incremental data, which is synchronized to database instance B from database instance A, back to database instance A. This loopback may create an endless synchronization cycle and lead to errors in database instances (e.g., duplicated key error).

To avoid loopbacks in synchronization, a synchronization tag field and a synchronization time field are inserted to an incremental dataset (e.g., in a data document in MongoDB instance) when the incremental dataset is synchronized from one database instance to another. An example synchronization tag field contains a source tag representing a database instance from which an incremental dataset is synchronized. The source tag can be empty, meaning that the incremental dataset is not from any database instances within the database environment, but an external source, and it is the first time for the incremental data to be written in the database environment. An example synchronization time tag field can include a timestamp representing the current time of synchronization.

For example, a database environment for a cloud-based application is created using MongoDB, which a document-oriented database program. The MongoDB environment for the cloud-based application includes a replica set of MongoDB instances in different geographical regions. Replica data documents are stored in replica MongoDB instances, and each MongoDB instance maintains an operation log (oplog). MongoSync is a data synchronization service in a MongoDB environment for synchronizing data from one region to another. The MongoSync service synchronizes the data documents between replica MongoDB instances. However, it should be understood that the synchronization and loopback control methods as will be described below may be applicable to any type of database instances.

The MongoSync service detects a new record entry in an oplog associated with a current MongoDB instance. The MongoSync service determines if a document identification is included in the new record entry, for example in the "o" field of the new record entry in the oplog for the current MongoDB instance.

If a document identification is included in the new record entry, the MongoSync service determines the operation on the current MongoDB instance is an insert or replace operation, meaning a new data document is inserted or the new data document replaced a previous data document in the current MongoDB instance. A synchronization process for an insert operation is illustrated herein. A synchronization process for a replace operation will be obvious to an ordinary operation killed in the art.

Once the MongoSync service detects an insert operation executed on the current MongoDB instance based on the new record entry in the oplog of the current MongoDB instance, it tries to synchronize the inserted data document to a target database instance. The MongoSync service checks if a source tag is included in the inserted data document. If the inserted data document does not include a source tag in the synchronization tag field, it indicates that the inserted data document was not replicated from any other MongoDB instance but instead was inserted to the current MongoDB instance by the application provider as the first time in the MongoDB environment. Thus, the MongoSync service can synchronize the inserted data document to the target MongoDB instance. A record entry is added to the oplog for the target MongoDB instance about the synchronization. Meanwhile, a source tag is added to a synchronization tag field of the replica of the inserted data document on the target MongoDB instance. The source tag in the replica of the inserted data document contains the identification of the current MongoDB instance.

However, if the inserted data document includes a source tag, the MongoSync service determines if the source tag contains an identification of the target MongoDB instance. If the source tag does not contain the identification of the target MongoDB instance, it indicates that the inserted document was not synchronized to the current MongoDB instance from the target MongoDB instance. The MongoSync service then synchronizes the inserted data document from the current MongoDB instance to the target MongoDB instance. If the source tag contains the identification of the target MongoDB instance, it indicates that the inserted data document was synchronized to the current MongoDB instance from the target MongoDB instance. The MongoSync service then skips the inserted data document without synchronizing it to the target MongoDB instance. This way, the loopback synchronization is avoided.

If a document identification is not included in the new record entry, the MongoSync service determines the operation on the current MongoDB instance is an update operation, meaning certain data in an existing data document is updated. The MongoSync service checks if the synchronization time field of the updated data document in the current MongoDB instance includes a synchronization time value. If the synchronization time field does not include a synchronization time value, it indicates that the update operation is not synchronized from other database instances, but an original update operation by the application service provider. If the synchronization time field includes a synchronization time value, the MongoSync service compares the synchronization time value with the oplog time in the new record entry of the oplog. If the synchronization time value is not equal to the oplog time, it indicates that certain non-synchronized change happened to the data document after last synchronization in the current MongoDB instance, the MongoSync service then synchronizes the update document to the target MongoDB instance. If the synchronization time value is equal to the oplog time, the MongoSync service may determine whether to synchronize or skip synchronization based on the source tag in the updated data document, similar to the synchronization process for the inserted data document as described above.

Thus, a source tag and a synchronization time inserted to an incremental dataset facilitates loopback control in database synchronization. For insert or replace operations, if a source tag in the synchronization tag field contains the identification of the target database instance, it indicates the inserted or replacement dataset in the current database instance was synchronized from the target database instance. The inserted or replacement dataset is not to be synchronized back to the target database instance. Therefore, loopback data is filtered out and certain database errors are avoided when synchronizing insert or replace operations. For update operations, if the synchronization time is equal to the oplog time in the new oplog record entry and the source tag contains the identification of the target database instance, it indicates the updated dataset in the current instance was synchronized from the target database instance. The updated dataset is then not to be synchronized back to the target database instance. Therefore, loopback data is filtered out and certain database errors are avoided when synchronizing update operations.

This illustrative example is given to introduce the reader to the general subject matter discussed herein and the disclosure is not limited to this example. The following sections describe various additional non-limiting examples and examples of loopback control in multi-active database synchronization.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
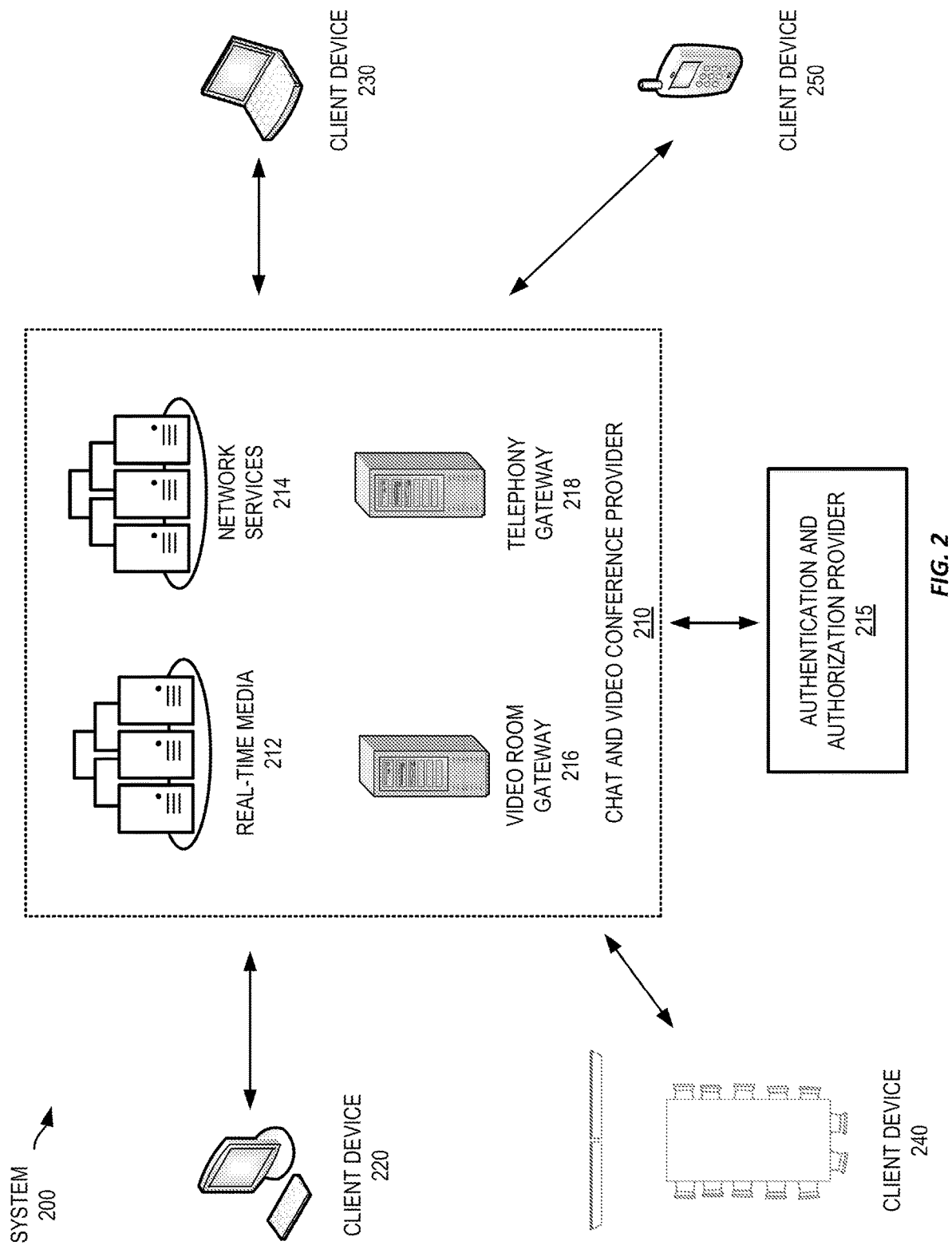
FIG. 2 shows an example system in which a chat and video conference provider provides chat and videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
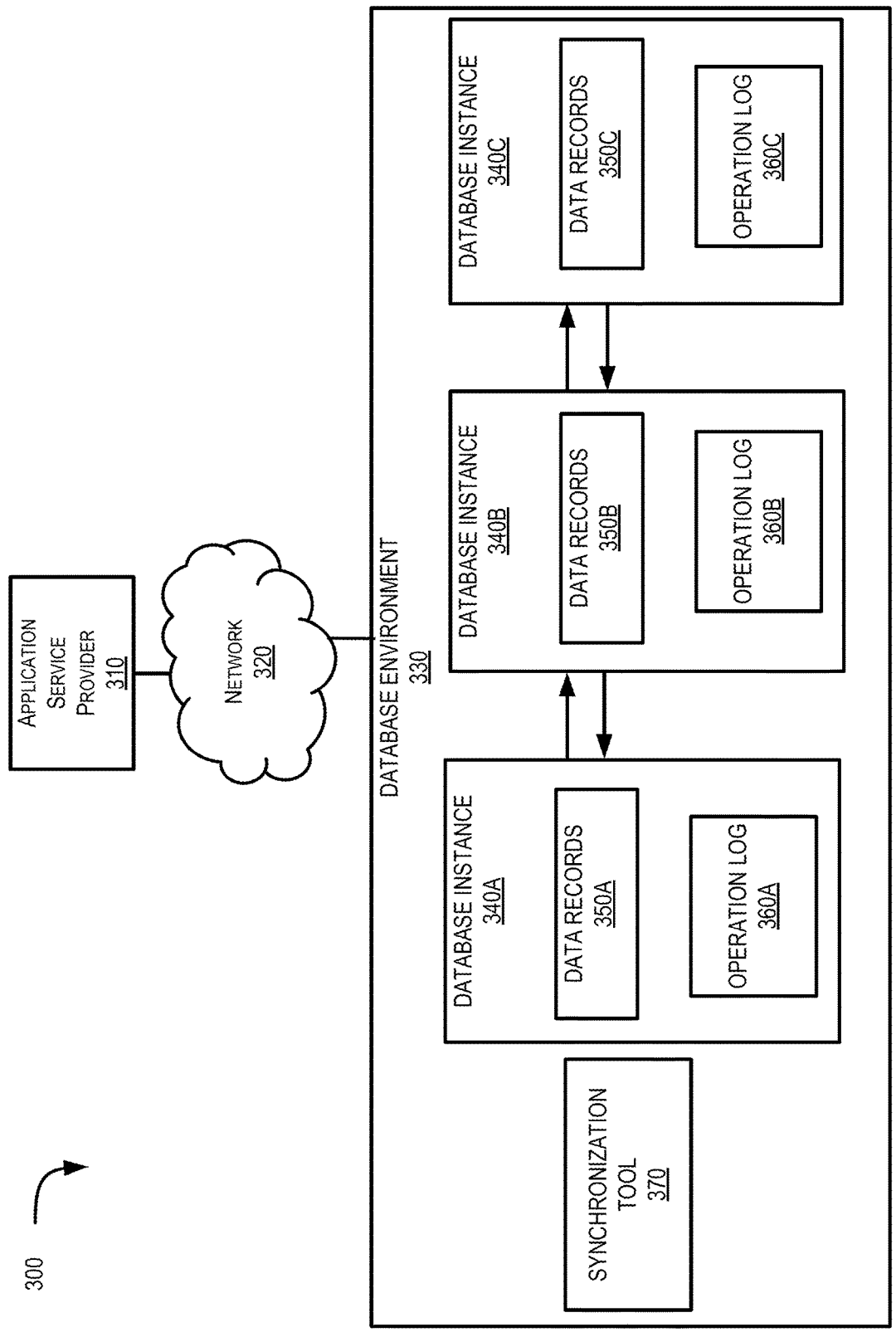
FIG. 3 shows an example system for database synchronization.

Referring now to FIG. 3, FIG. 3 shows an example system 300 for database synchronization. In this example system 300, an application service provider 310 is in network communication with a database environment 330 via a network 320. In this example, the network 320 is the internet, however, any suitable communications network or combination of communications network may be employed, including LANs (e.g., within a corporate private LAN) and WANs, similar to the network 110 illustrated in FIG. 1. The application service provider 310 can be the chat and video conference provider 110 illustrated in FIG. 1 or the chat and video conference provider 210 illustrated in FIG. 2. However, the application service provider 310 is not limited to providing chat and video conferencing functionalities only.

In this example, the application service provider 310 stores data in a database environment 330. The database environment 330 includes replica database instances 340A, 340B, and 340C (which may be referred to herein individually as a database instance 340 or collectively as the database instances 340). The replica database instances 340 may be located in different geographical regions. All the replica database instances 340 remain active to provide high availability to the application service provider 310. The replica database instances 340 can be configured for two-way synchronization. In FIG. 3, database instance 340A and database instance 340B are configured for two-way synchronization. That is, any data change happens in database instance 340A can be synchronized to the database instance 340B, and vice versa. Similarly, database instance 340B and database instance 340C are configured for two-way synchronization. That is, any data change happens in database instance 340B can be synchronized to the database instance 340C, and vice versa.

Each replica database instance 340 includes a set of replica data records, for example a set of data records 350A in database instance 340A, a set of data records 350B in database instance 340B, or a set of database records 350C in database instance 340C, which may be referred to herein individually as a data record 350 or collectively as the data records 350. The data records 350 in corresponding database instances 340 are replica data records. Each database instance 340 also includes an operation log, for example operation log 360A for database instance 340A, operation log 360B for database instance 340A, or operation log 360C for database instance, which may be referred to herein individually as an operation log 360 or collectively as the operation logs 360. The operation log 360 on each database instance 340 records operations to the data records 350 in the corresponding database instance 340.

The database environment 330 also includes a synchronization tool 370 configured for synchronizing the replica database instances 340 to ensure data records are consistent with each other among different database instances 340. For example, the synchronization tool 370 detects a new operation entry in an operation log 360A of a database instance 340A. The new operation entry is associated with a data operation on a data record 350A in database instance 340A. The synchronization tool 370 then replicates the data operation to a database instance 340B to ensure the data records 350B is consistent with the data records 350A. Data operations to a data record 350 on a database instance 340 can include an insert operation where a new data record is inserted into the database instance 340, a replace operation where a new data record is added to replace a previously existed data record on the database instance, and an update operation where certain data in an existing data record is updated.

In FIG. 3, changes in data records 350A in database instance 340A can be synchronized to database instance 340B, and changes in data records 350B on database instance 340B can also be synchronized to database instance 340A. Similarly, changes in data records 350B on database instance 340B can be synchronized to database instance 340C, and changes in data records 350C on database instance 340C can also be synchronized to database instance 340B. However, FIG. 3 just illustrates one synchronization configuration among replica database instances 340. The application service provider 310 or the database environment 330 can configure a synchronization relationship between different database instances 340.

When the synchronization tool 370 replicates a data operation in a data record in a source database instance to a corresponding data record in a target database instance that is in synchronization with source database instance, the synchronization tool 370 inserts a synchronization tag field and a synchronization time field to the data record in the target database instance. For example, the synchronization tool 370 synchronizes a data operation in a data record 350A in database instance 340A to a corresponding data record 350B in database instance 340B, the synchronization tool 370 inserts a synchronization tag field and a synchronization time field to the data record 350B.

A synchronization tag field can contain a source tag representing a database instance from which an incremental data change is synchronized. The source tag can be empty, meaning that the incremental dataset is not from any database instances within the database environment, but from an external source, and it is the first time for the incremental data change to be written in the database environment. The source tag can be used to filter out loopback data when synchronizing data operations associated with an incremental data change.

In addition, which can be optional, the synchronization tag field can also contain an operation time representing when a data operation is executed to a database instance. It can also be the time an operation log for the database instance is updated with a new record entry for the data operation. The operation time can be current time in seconds. Optionally in addition to the operation time, the synchronization tag field can also contain at least one part of the current time with higher precision than the operation time, for example, the last six digits of the current time in nanoseconds. Since the operation time has an accuracy of seconds, with the last six digits of the current time in nanoseconds, different incremental data change which happened in the same second can have different values in the respective synchronization tag field. An application service provider 310 usually does not have over one million operations every second. Because a synchronization tag field contains a second part and a nanosecond part, different incremental data changes usually have their unique values in the synchronization tag field. The at least one part of the current time with a higher precision can be used for troubleshooting database errors.

For example, a synchronization tag for a MongoDB data document is in a format of "tag-_-oplog time-_-last six digits of nanoseconds. An example synchronization tag for a MongoDB data document is us01-va-_-1671174003817-_-728768, where the source tag us01-va indicates the source database instance, the time 1671174003817 is the operation time (oplog timestamp) of the synchronization in seconds in Unix time, and 728768 is the last six digits of the oplog time in nanoseconds. In addition, the synchronization tag for a MongoDB document can also include a cluster time representing a logical time for ordering data operations.

An example synchronization time tag field can include a Binary Javascript Object Notation (BSON) timestamp, which includes the current time of synchronization (e.g., seconds) and an incremental order number of the synchronization. For example, a synchronization time is timestamp {1671174003,26}. The number 1671174003 is the current time for synchronization in seconds in Unix time. The number 26 is the incremental order of the synchronization operation at the current time 1671174003 seconds, indicating this synchronization is the $26^{th}$ operation in one second.

Alternatively, or additionally, a replica database instance (e.g., 340A) can include a synchronization tool (not shown) to detect changes in an operation log in a counterpart database instance (e.g., 340B) that is configured for synchronization with the replica database instance (e.g., 340A) and synchronize or replicate a data operation in the counterpart database instance (e.g., 340B) to the replica database instance (e.g., 340A).

Referring now to FIG. 4, FIG. 4 shows an example operation entry 400 in an operation log for an insert operation to a data record. The example operation entry 400 is from an oplog for a MongoDB instance, though any suitable format for an operation entry may be employed. Among others, the example operation entry 400 includes an "op" field 405 corresponding to the type of operation performed. In this example, the corresponding value is "i" representing an insert operation. The example operation entry 400 also includes an "o" field 410 representing a new state of a data document after the insert operation. Among others, the "o" field 410 includes an "_id" field 415 corresponding to a document identification (ID) 420 of the data document that is inserted in a MongoDB instance. The example operation entry 400 also includes a "ts" field 425 corresponding to a timestamp 430 for the insert operation, which is also the oplog time. The timestamp 430 is a Binary Javascript Object Notation (BSON) timestamp. The timestamp 430 includes the current time of the insert operation (e.g., 1672313918 s in Unix time) and an order number (e.g., 2) of the insert operation among data operations in current time (e.g., 1672313918 s in Unix time).

Referring now to FIG. 5, FIG. 5 shows an example operation entry 500 in an operation log for an insert operation to a data record. The example operation entry 500 is from an oplog for a MongoDB instance, though any suitable format for an operation entry may be employed. Among others, the example operation entry 500 includes an "op" field 505 corresponding to the type of operation performed. In this example, the corresponding value is "u" representing an update operation. The example operation entry 500 also includes an "o" field 510 representing a new state of a data document after the update operation. The "o" field 510 includes a "diff" field 515 representing difference between the old data documents and the updated data document. The example operation entry 500 is from an oplog for a MongoDB instance of a 5.x version or higher. In an oplog for a MongoDB instance of a 4.x version, the "o" field 510 includes a "set" field corresponding to a new data value in the data document and/or a "unset" field corresponding to a data value deleted from the data document. The "o" field 510 in the example operation entry 500 for the update operation does not include a field representing a document ID. Instead, the example operation entry 500 includes an "o2" field 520, which includes an "_id" field 525 corresponding to the document ID 530 of the updated data document. Similar to the example operation entry 400 for an insert operation, the example operation entry 500 for an update operation also includes a "ts" field 535 including a timestamp 540 for the update operation.

Figure 6:
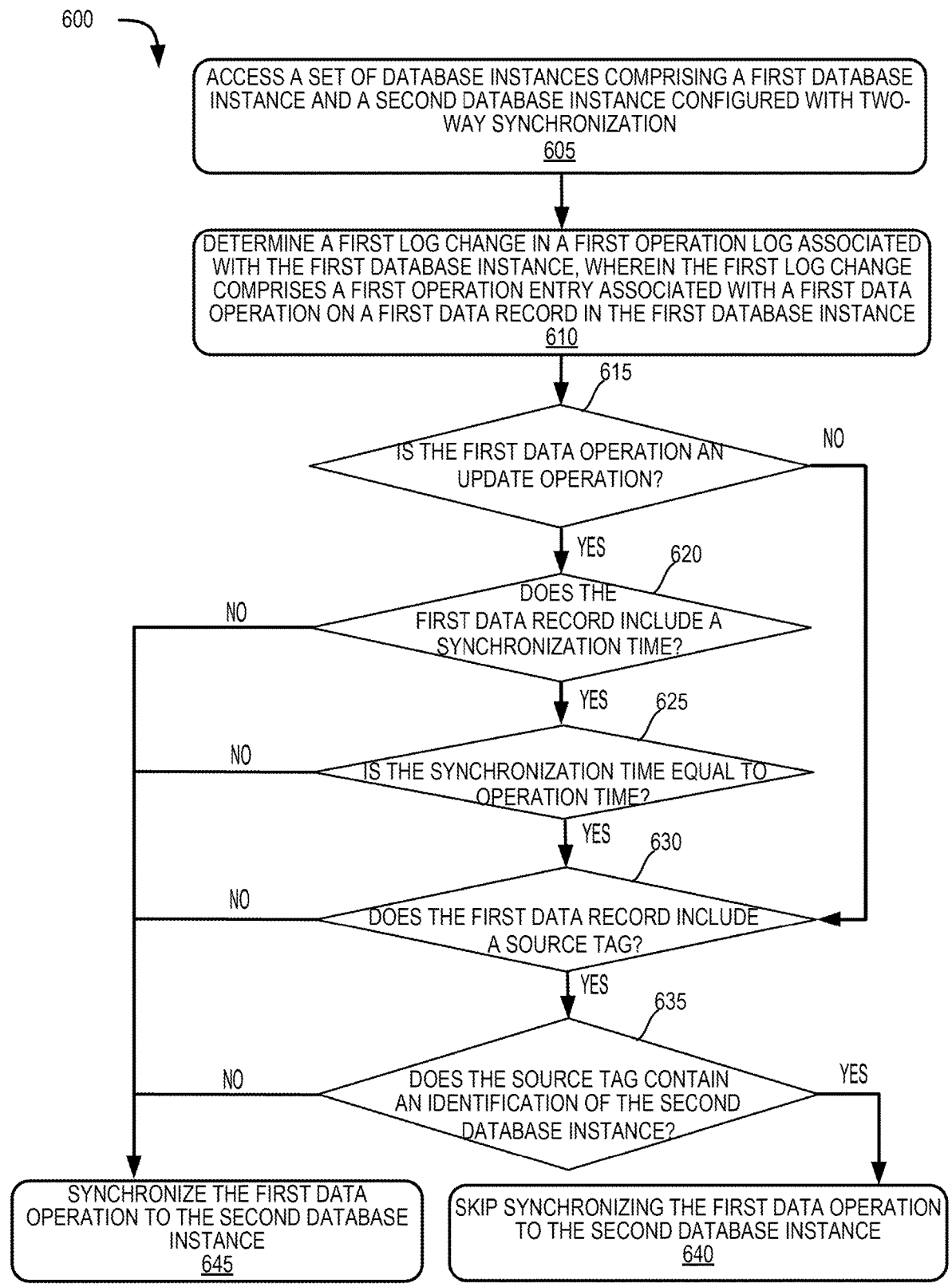
FIG. 6 shows an example process for synchronizing a data operation to a target database instance with loopback control.

Referring now to FIG. 6, FIG. 6 shows an example process 600 for synchronizing a data operation to a target database instance with loopback control. The example method 600 will be discussed with respect to the system 300 shown in FIG. 3; however, any suitable system for providing database synchronization with loopback control may be used. At block 605, a synchronization tool 370 accesses a set of database instances 340 comprising a first database instance 340A and a second database instance 340B configured with two-way synchronization. The set of database instances 340 are replica database instances in one database environment for an application service provider 310 to provide high availability. When there is a change in a data record in a database instance, the database instance logs the data change in an operation log. The synchronization tool 370 in the database environment 330 can monitor and detect changes in the operation logs for corresponding database instances, such as a new operation entry, and determines if the data change reflected in the new operation entry needs to be synchronized or replicated to other database instances.

At block 610, the synchronization tool 370 determines a first log change in a first operation log 360A associated with the first database instance 340A. The synchronization tool 370 can continuously or periodically monitor the operation logs corresponding to different replica database instances. When a log change happens in an operation log, the synchronization tool 370 can detect the log change. The first log change includes a first operation entry associated with a first data operation on a first data record 350A in the first database instance 340A. The first operation entry is a new operation entry, including information associated with the first data operation, which is a new data operation, on the first data record 350A in the first database instance 340A.

At block 615, the synchronization tool 370 determines if the first data operation is an update operation. An operation entry in an operation log may include information indicating what type of data operation. For example, in a MongoDB environment, the synchronization tool 370 is the MongoSync service and an operation log is called oplog. An operation entry in an oplog includes an operation type field. The MongoSync service can check a corresponding value in the operation type field. If the corresponding value is "i," it indicates that the data operation is an insert operation. If the corresponding value is "u," it indicates that the data operation is an update operation. Alternatively, or additionally, the MongoSync service can check an "o" field in the operation entry, including certain information about the data operation. If the "o" field includes an "_id" field with a value corresponding to a document ID, it indicates the data operation is an insert or replace operation to insert a new data document with the corresponding document ID. In contrast, if the "o" field does not include an "_id" field, it indicates that the data operation is an update operation to an existing data document.

In some examples, the format of an operation entry in an operation log may change due to version upgrade or other reasons. The synchronization service is configured to analyze the operation entry in the operation log and convert data fields if needed in order to determine the type of the data operation. For example, in order to determine if the data operation is an update operation on a data document in a MongoDB instance, the MongoSync service may determine if the oplog is for a higher MongoDB version, such as 5.x or 6.x which includes a "diff" field. If so, the MongoSync service can convert the oplog to a 4.x version to parse the "diff" field into a "set" field, corresponding to a new data value in the data document, or an "unset" field corresponding to a data value deleted from the data document. If the "set" field does not include a value, it can indicate that there is no update operation to the data document. If the "set" field includes values, it can indicate that it is an update operation to the data document. If the synchronization tool 370 determines the first data operation is not an update operation, the process 600 proceeds to block 630, which will be described in detail below. If the synchronization tool 370 determines the first data operation is an update operation, the process 600 then proceeds to block 620.

At block 620, the synchronization tool 370 determines if the first data record 350A includes a synchronization time. The first data record 350A can include a synchronization time filed, corresponding to a timestamp value representing the time for the first data record 350A is synchronized to a corresponding data record in another database instance. If the synchronization time field does not include a synchronization timestamp, it indicates that the first data operation is not a synchronization operation that synchronizes the first data record 350A to a corresponding data record on another database instance, for example, it can be an original data operation by the application service provider 310. That is, the first data operation needs to be synchronized or replicated to other database instances. The process 600 then proceeds to block 645, where the synchronization tool 370 synchronizes the first data operation to the second database instance 340B. If the first data record 350A includes a synchronization timestamp, in indicates the first data operation is synchronized or replicated from another database instance, and the process 600 proceeds to block 625.

At block 625, the synchronization tool 370 determines if the synchronization time is equal to an operation time in the first operation entry associated with the first data operation. In some examples, the synchronization time is a BSON timestamp, including the current time of synchronization (e.g., in seconds) and an incremental order number of the synchronization; and the operation time is also a BSON timestamp, including the current time of operation (e.g., in seconds) and an incremental order number of the operation. The synchronization tool may only compare the current times, the incremental order numbers, or both to determine if these two timestamps. If the current times are different or the incremental order numbers are different, the synchronization time and the operation time are different. If the current times are equal to each other and the incremental order numbers are equal to each other, the synchronization time and the operation time are equal to each other.

If the synchronization time is not equal to an operation time in the first operation entry associated with the first data operation, it indicates that the first data operation is not a synchronization operation happened at the synchronization time. In other words, the first data operation was not synchronized or replicated from another database instance. For example, it can be a data operation directly by the application service provider 310. Thus, the process 600 proceeds to block 645, where the synchronization tool 370 synchronizes the first data operation to the second database instance 340B. If the synchronization time is equal to an operation time in the first operation entry associated with the first data operation, it indicates that the first data operation is a synchronization operation, the process 600 then proceeds to block 630.

At block 630, the synchronization tool 370 determines if the first data record 350A includes a source tag. The first data record 350A can include a synchronization tag field if certain synchronization operation was performed on the first data record 350A. The synchronization tag field may include a source tag representing a data source of a corresponding synchronization. If the first data record does not include a source tag, it indicates that the first data operation is not a synchronization operation. It can be an original data operation by the application service provider 310. The process 600 the proceeds to block 645, where the synchronization tool 370 synchronizes the first data operation to the second database instance 340B. However, this situation can be rare, because block 625 already determines that the synchronization time is equal to the operation time, which usually indicates the first data operation is a synchronization operation. If the first data record includes a source tag, the process 600 proceeds to block 635.

At block 635, the synchronization tool 370 determines if the source tag contains an identification of the second database instance. If the synchronization tool 370 determines that the source tag does not contain an identification of the second database instance 340B, it indicates that even though the first data operation is a synchronization operation, it was not synchronized from the second database instance 340B which is a target database instance for synchronization. The process 600 the proceeds to block 645, where the synchronization tool 370 synchronizes the first data operation to the second database instance 340B. If the synchronization tool 370 determines that the source tag contains an identification of the second database instance 340B, it indicates that the first data operation was synchronized from the second database instance. Thus, the process 600 proceeds to block 640.

At block 640, the synchronization tool 370 skips synchronizing the first data operation to the second database instance 340B. If the synchronization tool 370 determines that the first data operation was synchronized or replicated from the second database instance 340B, as described at block 635, the synchronization tool 370 then skips synchronizing the first data operation back to the second database instance to avoid data loopback.

The example process 600 illustrates a method of synchronizing a data operation to a target database instance with loopback control. However, not every step in the example process 600 may be needed for every synchronization operation, or other suitable parameters or tags can be added or checked to determine if a data operation should be filtered out or replicated for database synchronization. For example, if an application service provider 310 only employs two database instances configured for two-way synchronization. For an update operation, the synchronization tool 370 may only need to check a synchronization time at block 620 and compare the synchronization time in the data document with the operation time for the first data operation in an operation log at block 625 to determine the first data operation should be synchronized to the second database instance or not, without checking source tag information at block 630 or comparing the source tag with the identification of the second database instance at block 635. However, when the set of database instances includes three or more database instances configured for two-way synchronization, blocks 630 and 635 are also needed, besides blocks 620 and 625, for determining synchronization of an update operation.

Figure 7:
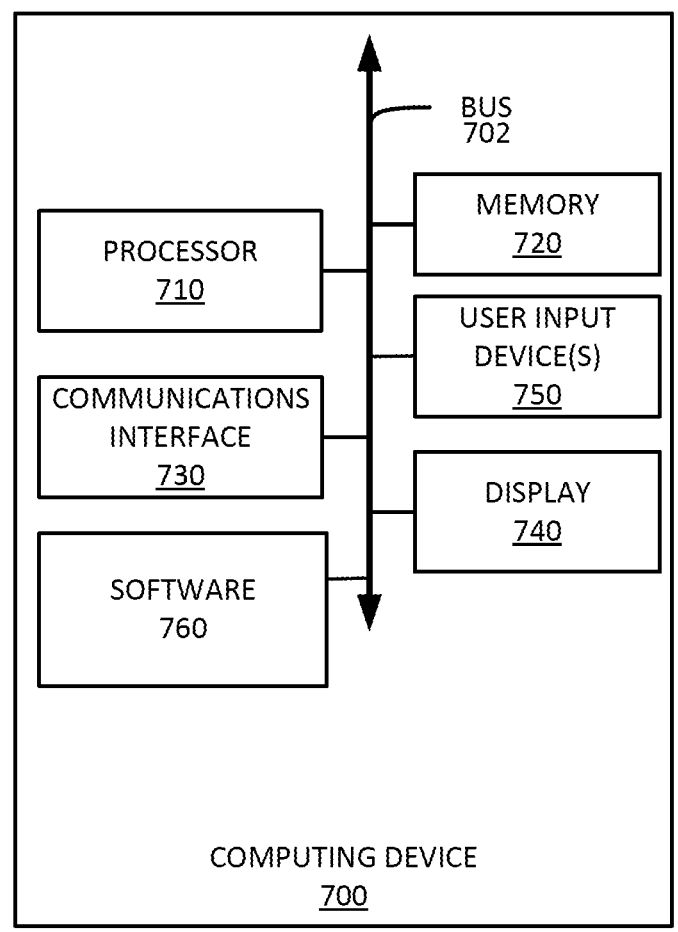
FIG. 7 shows an example computing device suitable for use with example systems and methods for database synchronization with loopback control.

Referring now to FIG. 7, FIG. 7 shows an example computing device 700 suitable for use in example systems or methods for database synchronization with loopback control according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for synchronizing a data operation to a target database instance with loopback control according to different examples, such as part or all of the example method 600 described above with respect to FIG. 6. In some embodiments, the computing device may include software 760 for executing one or more methods described herein, such as for example, one or more steps of methods 600. The computing device 700, in this example, also includes one or more user input devices 750, such as a keyboard, mouse, touchscreen, microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   accessing a set of database instances comprising a first database instance and a second database instance, wherein the first database instance and the second database instance are configured with two-way synchronization;
   detecting a first log change in a first operation log associated with the first database instance, wherein the first log change comprises a first operation entry associated with a first data operation on a first data record in the first database instance, wherein the first data record comprises a first synchronization tag field comprising a first source tag representing a first data source associated with the first data operation on the first data record; and
   synchronizing the second database instance with the first database instance, comprising:
      comparing the first source tag in the first data record with an identification of the second database instance;
      in response to determining the first source tag in the first data record does not contain the identification of the second database instance, performing a second data operation comprising replicating the first data operation to a second data record in the second database instance, wherein the second data record corresponds to the first data record; and
      inserting a second source tag in a second synchronization tag field in the second data record, wherein the second source tag comprises an identification of the first database instance.

2. The method of claim 1, further comprising:
   in response to determining the first source tag contains the identification of the second database instance, skipping replicating the first data operation on the second data record in the second database instance.

3. The method of claim 1, further comprising:
   prior to comparing the first source tag in the first synchronization tag field with an identification of the second database instance,
   determining the first data operation is an insert or replace operation based on information in the first operation entry.

4. The method of claim 1, wherein the first data record further comprises a first synchronization time field, wherein the method further comprises:
   prior to comparing the first source tag in the first synchronization tag field with an identification of the second database instance,
   determining the first data operation is an update operation based on information in the first operation entry;
   comparing a first synchronization timestamp in the first synchronization time field to a first operation timestamp in the first operation entry; and
   in response to determining that the first synchronization timestamp is identical to the first operation timestamp, comparing the first source tag in the first synchronization tag field with the identification of the second database instance.

5. The method of claim 4, further comprising:
   in response to determining the first synchronization timestamp is different from the first operation timestamp, performing the second data operation comprising replicating the first data operation to the second data record in the second database instance.

6. The method of claim 1, wherein the first synchronization tag field in the first data record further comprises an operation time in seconds and at least a portion of the operation time in nanoseconds associated with the first data operation.

7. The method of claim 1, wherein the second synchronization tag field in the second data record further comprises an operation time in seconds and at least a portion of the operation time in nanoseconds associated with the second data operation.

8. The method of claim 1, further comprising updating a second operation log associated with the second database instance by adding a second operation entry associated with the second data operation.

9. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
      access a set of database instances comprising a first database instance and a second database instance, wherein the first database instance and the second database instance are configured with two-way synchronization;
      detect a first log change in a first operation log associated with the first database instance, wherein the first log change comprises a first operation entry associated with a first data operation on a first data record in the first database instance, wherein the first data record comprises a first synchronization tag field comprising a first source tag representing a first data source associated with the first data operation on the first data record; and
      synchronize the second database instance with the first database instance, comprising:
         comparing the first source tag in the first data record with an identification of the second database instance;
         in response to determining the first source tag in the first data record does not contain the identification of the second database instance, performing a second data operation comprising replicating the first data operation to a second data record in the second database instance, wherein the second data record corresponds to the first data record; and inserting a second source tag in a second synchronization tag field in the second data record, wherein the second source tag comprises an identification of the first database instance.

10. The system of claim 9, wherein the one or more processors are configured to execute further processor-executable instructions stored in the non-transitory computer-readable medium to:

in response to determining the first source tag contains the identification of the second database instance, skip replicating the first data operation on the second data record in the second database instance.

11. The system of claim 9, wherein the one or more processors are configured to execute further processor-executable instructions stored in the non-transitory computer-readable medium to:

prior to comparing the first source tag in the first synchronization tag field with an identification of the second database instance, determine the first data operation is an insert or replace operation based on information in the first operation entry.

12. The system of claim 9, wherein the first data record further comprises a first synchronization time field, wherein the one or more processors are configured to execute further processor-executable instructions stored in the non-transitory computer-readable medium to:

prior to comparing the first source tag in the first synchronization tag field with an identification of the second database instance, determine the first data operation is an update operation based on information in the first operation entry;

compare a first synchronization timestamp in the first synchronization time field to a first operation timestamp in the first operation entry; and in response to determining that the first synchronization timestamp is identical to the first operation timestamp, compare the first source tag in the first synchronization tag field with the identification of the second database instance.

13. The system of claim 12, wherein the one or more processors are configured to execute further processor-executable instructions stored in the non-transitory computer-readable medium to:

in response to determining the first synchronization timestamp is different from the first operation timestamp, perform the second data operation comprising replicating the first data operation to the second data record in the second database instance.

14. The system of claim 9, wherein the one or more processors are configured to execute further processor-executable instructions stored in the non-transitory computer-readable medium to:

update a second operation log associated with the second database instance by adding a second operation entry associated with the second data operation.

15. A non-transitory computer-readable medium comprising processor-executable instructions configured to cause one or more processors to:

access a set of database instances comprising a first database instance and a second database instance, wherein the first database instance and the second database instance are configured with two-way synchronization;

detect a first log change in a first operation log associated with the first database instance, wherein the first log change comprises a first operation entry associated with a first data operation on a first data record in the first database instance, wherein the first data record comprises a first synchronization tag field comprising a first source tag representing a first data source associated with the first data operation on the first data record; and synchronize the second database instance with the first database instance, comprising:

comparing the first source tag in the first data record with an identification of the second database instance;

in response to determining the first source tag in the first data record does not contain the identification of the second database instance, performing a second data operation comprising replicating the first data operation to a second data record in the second database instance, wherein the second data record corresponds to the first data record; and inserting a second source tag in a second synchronization tag field in the second data record, wherein the second source tag comprises an identification of the first database instance.

16. The non-transitory computer-readable medium of claim 15, further comprising processor-executable instructions configured to cause one or more processors to:

in response to determining the first source tag contains the identification of the second database instance, skip replicating the first data operation on the second data record in the second database instance.

17. The non-transitory computer-readable medium of claim 15, further comprising processor-executable instructions configured to cause one or more processors to:

prior to comparing the first source tag in the first synchronization tag field with an identification of the second database instance, determine the first data operation is an insert or replace operation based on information in the first operation entry.

18. The non-transitory computer-readable medium of claim 15, wherein the first data record further comprises a first synchronization time field, wherein the non-transitory computer-readable medium further comprises processor-executable instructions configured to cause one or more processors to:

prior to comparing the first source tag in the first synchronization tag field with an identification of the second database instance, determine the first data operation is an update operation based on information in the first operation entry;

compare a first synchronization timestamp in the first synchronization time field to a first operation timestamp in the first operation entry; and in response to determining that the first synchronization timestamp is identical to the first operation timestamp, compare the first source tag in the first synchronization tag field with the identification of the second database instance.

19. The non-transitory computer-readable medium of claim 18, further comprising processor-executable instructions configured to cause one or more processors to:

in response to determining the first synchronization timestamp is different from the first operation timestamp, perform the second data operation comprising replicating the first data operation to the second data record in the second database instance.

20. The non-transitory computer-readable medium of claim 15, further comprising processor-executable instructions configured to cause one or more processors to:
update a second operation log associated with the second database instance by adding a second operation entry associated with the second data operation.

* * * * *